United States Patent
Retallick et al.

(10) Patent No.: US 7,179,313 B2
(45) Date of Patent: Feb. 20, 2007

(54) REGENERATIVE AUTOTHERMAL CATALYTIC STEAM REFORMER

(75) Inventors: William B. Retallick, West Chester, PA (US); William A. Whittenberger, Leavittsburg, OH (US)

(73) Assignee: Catacel Corp., Leavittsburg, OH (US)

( * ) Notice: Subject to any disclaimer, the term of this patent is extended or adjusted under 35 U.S.C. 154(b) by 553 days.

(21) Appl. No.: 10/347,130

(22) Filed: Jan. 17, 2003

(65) Prior Publication Data

US 2004/0020125 A1 Feb. 5, 2004

Related U.S. Application Data

(63) Continuation-in-part of application No. 10/211,083, filed on Aug. 2, 2002.

(51) Int. Cl.
- C10J 8/00 (2006.01)
- B01J 3/20 (2006.01)
- B01J 7/00 (2006.01)
- B01J 8/04 (2006.01)
- B01J 8/00 (2006.01)

(52) U.S. Cl. .............. 48/75; 48/61; 48/127.9; 48/63; 422/187; 422/188; 422/129

(58) Field of Classification Search .......... 422/198, 422/110; 48/196; 23/288; 700/35, 282; 27/6; 518/728
See application file for complete search history.

(56) References Cited

U.S. PATENT DOCUMENTS

| | | | | | |
|---|---|---|---|---|---|
| 2,556,835 | A | * | 6/1951 | Barr | 48/198.1 |
| 2,845,335 | A | * | 7/1958 | Hasche | 422/206 |
| 6,290,913 | B1 | * | 9/2001 | Aoyama | 422/110 |
| 2003/0105172 | A1 | * | 6/2003 | Bowe et al. | 518/728 |

FOREIGN PATENT DOCUMENTS

JP 02129002 A * 5/1990

* cited by examiner

*Primary Examiner*—Glenn Caldarola
*Assistant Examiner*—Kaity Handal
(74) *Attorney, Agent, or Firm*—William H. Eilberg

(57) ABSTRACT

A compact steam reformer produces hydrogen to power a fuel cell, such as can be used in a vehicle. The steam reformer includes a first channel, at least partly coated with a steam reforming catalyst, and a second channel, at least partly coated with a combustion catalyst, the channels being in thermal contact with each other. Heat from the combustion is used in the steam reforming reaction. In another embodiment, the gas streams feeding the reforming and combustion channels pass through a valve which reverses the gas streams periodically. The combustion channel becomes the reforming channel, and vice versa, so that carbon deposits in the former reforming channel are burned off. This arrangement enables the reforming reaction to continue indefinitely at peak efficiency.

4 Claims, 6 Drawing Sheets

REGENERATIVE AUTOTHERMAL CATALYTIC STEAM REFORMER

CROSS-REFERENCE TO PRIOR APPLICATION

This is a continuation-in-part of U.S. patent application Ser. No. 10/211,083, filed Aug. 2, 2002, entitled "Autothermal Catalytic Steam Reformer".

BACKGROUND OF THE INVENTION

This invention relates to the field of catalytic steam reforming of hydrocarbons to make hydrogen.

The hydrogen produced by the present invention may be used, for example, to operate a fuel cell. In a fuel cell, hydrogen is consumed during the process of producing electric power.

Steam reforming refers to the endothermic reaction whereby hydrogen is produced from methane, or from some other hydrocarbon. The steam reforming reaction, when the fuel is methane, is as follows:

$$CH_4 + H_2O \rightarrow CO + 3H_2$$

For reforming a C8 hydrocarbon, the reaction is:

$$C_8H_{18} + 8H_2O \rightarrow 8CO + 17H_2$$

If the fuel cell is to be used to power a vehicle, the fuel cell, and the steam reformer used to supply hydrogen to the fuel cell, must be compact. Also, steps must be taken to reduce or eliminate the carbon monoxide products, which will quickly poison the membrane in the fuel cell. The present invention provides a practical, compact catalytic steam reformer, which can be used on a vehicle, or in other environments where space is severely limited.

A problem encountered in steam reforming is the deposit of carbon on the reforming catalyst. Although elemental carbon does not explicitly appear in the equations shown above, it turns out that the steam reforming reaction does produce at least small amounts of carbon which, if allowed to build up, will eventually smother the catalyst and thereby render it useless. Carbon deposits are most likely to be produced when the fuel is a heavy hydrocarbon, such as a hydrocarbon having 12 or more carbon atoms per molecule. An example of such a heavy hydrocarbon is the fuel known as JP8.

Moreover, to the extent that less than all of the hydrocarbon fuel is converted in the steam reforming reaction, some of the unconverted fuel will enter the fuel cell downstream of the reactor. When unconverted fuel appears in the fuel cell, carbon deposits are likely to form, and the fuel cell may be rendered inoperative. The smaller the fraction of fuel that is converted in the steam reformer, the greater the likelihood that the performance of the fuel cell will be harmed. That is why it is essential, in a commercial steam reformer, to operate continuously at or near maximum efficiency.

The present invention therefore includes an embodiment which insures that the fuel will be fully converted, or nearly so, in the steam reforming reaction.

Another problem with steam reformers is their tendency to accumulate sulfur. This is especially problematic with reformers using JP-8 and diesel fuel. The sulfur deposits tend to accumulate mostly in the coolest areas of the reactor. The present invention includes means for reducing or eliminating the problem of sulfur deposits.

SUMMARY OF THE INVENTION

In its simplest form, the steam reformer of the present invention comprises a reactor having a first strip of metal which is coated with a reforming catalyst on one side and with a combustion catalyst on the other side. This strip is confined between two uncoated strips which define a combustion channel on one side of the first strip and a reforming channel on the other side. Hydrocarbon plus steam flows through the reforming channel and hydrocarbon plus air flows through the combustion channel. Hydrocarbon is injected into the combustion channel at points along the length of the channel to maintain the temperature. Heat from the combustion channel is absorbed in the adjacent steam reforming channel, to drive the steam reforming reaction.

In a more preferred embodiment, the reactor comprises a stack of strips, defining a plurality of channels. Alternate channels are coated, at least partially, with a steam reforming catalyst, and the remaining channels are coated, at least partially, with a combustion catalyst. A mixture of hydrocarbon fuel and steam is directed into the steam reforming channels, and a mixture of hydrocarbon fuel and air is directed into the combustion channels. Additional hydrocarbon fuel is injected along the length of the combustion channels. As before, heat from the combustion channels is absorbed in the adjacent steam reforming channels.

In another preferred embodiment, the present invention comprises a plurality of stacks or modules, each constructed as described above. In this case, the additional hydrocarbon fuel can be injected before each stack, i.e. at the junction between successive stacks.

In another preferred embodiment, the steam reforming reaction is followed by a water-gas shift reaction, for converting carbon monoxide to carbon dioxide and hydrogen. Each steam reforming channel (in the case of a single-module reactor) or each steam reforming channel of the last stack (in the case of a plurality of stacks connected in series) is connected to a channel which is at least partially coated with a water-gas shift catalyst. A cooling channel is provided adjacent to each such water-gas shift channel. In the water-gas shift channel, carbon monoxide reacts with water and is converted to carbon dioxide and hydrogen. The cooling channel reduces the temperature of the water-gas shift reaction so as to maximize the conversion of carbon monoxide to carbon dioxide.

In another embodiment, the invention includes an arrangement which compensates for the buildup of carbon deposits on the reforming catalyst. In this embodiment, the gas streams flowing into the reforming channel and the combustion channel are first directed through a two-position valve, or its equivalent. In its first position, the valve directs steam and fuel into the reforming channel, and directs air and fuel into the combustion channel. In its second position, the valve reverses the flow, and directs the steam and fuel into what was previously the combustion channel, and the air and fuel into what was previously the reforming channel. A second two-position valve, connected to operate simultaneously with the first valve, is located at the outlet end of the reactor, and maintains the relative positions of the gas streams. The same catalyst is used in both channels, and can comprise palladium and zirconia. The positions of the valves are controlled according to a measurement taken at the outlet end of the reactor. When the conversion ratio of the hydrocarbon (defined as the percentage of the hydrocarbon that is converted into carbon monoxide and hydrogen) falls appreciably below 100%, the unreformed hydrocarbon will appear in the effluent stream. When the concentration of the hydrocarbon in the effluent rises above a predetermined level, the system generates a signal to change the position of the valves. The steam reforming channel becomes the combustion channel, and the combustion channel becomes the steam reforming channel. Combustion in what was previously the reforming channel burns off the carbon deposits, which supplies part of the heat for the reforming reaction taking place in what was formerly the combustion channel. Thus, the steam reforming process can be conducted continuously and at or near peak efficiency.

In still another embodiment, the direction of gas flows through the channels are periodically reversed. This periodic reversal of flow is preferably accomplished by the same valve system that switches the channels. Flow reversal overcomes the problem associated with temperature gradients in the channel, as it insures that the regions that are relatively cool will periodically become the regions that are relatively hot. This arrangement minimizes the buildup of sulfur deposits in the reformer.

The present invention therefore has the primary object of providing a catalytic steam reformer.

The invention has the further object of providing an autothermal steam reformer, i.e. one which itself supplies the heat necessary to drive the steam reforming reaction.

The invention has the further object of providing a steam reformer which comprises a plurality of channels which are in intimate contact with each other.

The invention has the further object of providing a steam reformer for generating hydrogen for use in a fuel cell.

The invention has the further object of providing a steam reformer which is compact.

The invention has the further object of providing a steam reformer which is sufficiently compact that the reformer can be used in a vehicle.

The invention has the further object of providing a compact steam reformer which includes means for converting carbon monoxide produced by the steam reforming process, to carbon dioxide and hydrogen.

The invention has the further object of providing a compact and long-lived catalytic steam reformer for producing hydrogen for use in a fuel cell in a vehicle.

The invention has the further object of providing a method of generating hydrogen, through the use of a steam reformer.

The invention has the further object of providing a steam reformer which automatically regenerates itself by removing carbon deposits, and which therefore can be operated for extended periods with maximal efficiency.

The invention has the further object of providing a steam reformer which minimizes the formation of sulfur deposits.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
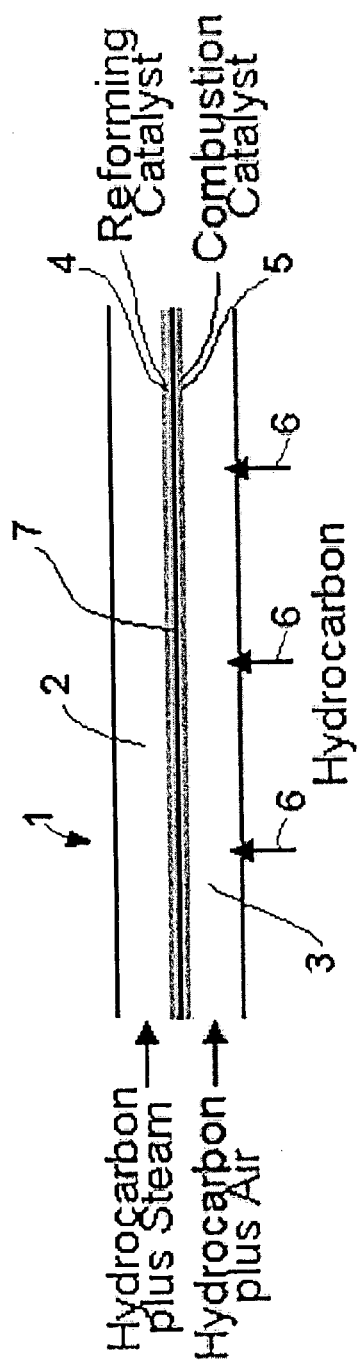
FIG. 1 provides a simplified schematic diagram of a first embodiment of the steam reformer of the present invention.

The simplest form of the invention is shown in the schematic diagram of FIG. 1. Reactor 1 comprises three strips which define two adjacent channels. The first channel 2 is a reforming channel, i.e. it is where the steam reforming reaction occurs. The second channel 3 is a combustion channel.

In the embodiment shown, the middle strip 7 is coated on one side with reforming catalyst 4, and on the other side with combustion catalyst 5. Thus, first channel 2 has walls which are partially coated with reforming catalyst 4, and second channel 3 has walls which are partially coated with combustion catalyst 5. By "reforming catalyst" is meant a catalyst that promotes the steam reforming reaction discussed above.

A mixture of a hydrocarbon and steam is injected as shown at the left-hand side of the reforming channel. A mixture of a hydrocarbon and air is injected as shown at the left-hand side of the combustion channel. The hydrocarbon comprises fuel for the combustion.

The steam reforming reaction is endothermic, which means that it absorbs heat. The heat is supplied by the combustion which proceeds in the combustion channel, which is, in the embodiment of FIG. 1, located on the other side of the strip.

In the arrangement of FIG. 1, the middle strip 7 is coated, and the other strips are not coated. It is possible to use other coating schemes, whereby the steam reforming channels and/or combustion channels can be fully coated, or partially coated to varying degrees. All of such alternatives are included within the scope of the present invention.

If all of the fuel were injected at the inlet, the fuel would tend to burn there, causing a large temperature increase at the inlet. But the steam reforming reaction is not fast enough to absorb all of the heat produced at the inlet, and the result would be an inefficient reformer. In a practical reformer, the conversion of the hydrocarbon must exceed about 95%.

The desired efficiency can be achieved by injecting hydrocarbon fuel at points along the combustion channel. Doing so will increase the combustion temperature to 800–900° C. at each such point.

FIG. 1 shows additional hydrocarbon fuel being injected into the combustion channel, at various positions along the channel, as indicated by arrows 6. Heat from the combustion is conducted through the common wall of the two channels, and this heat is absorbed by the endothermic steam reforming reaction. Note that additional fuel, but not air, is injected along the combustion path.

In the preferred embodiment, the hydrocarbon fuel injected into the reforming channel has the same composition as the fuel injected into the combustion channel. Thus, the two channels can be supplied with fuel from the same source. Catalytic combustion in the combustion channel supplies the heat to drive the reforming reaction.

Figure 2:
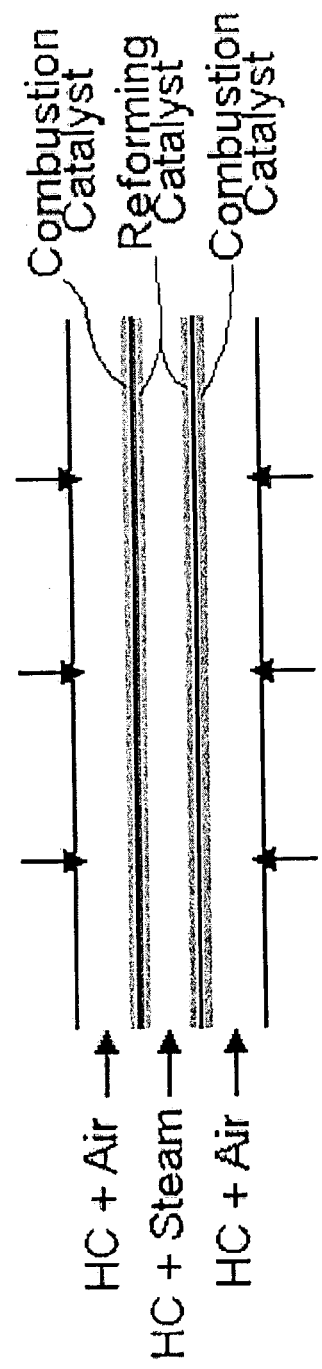
FIG. 2 provides a schematic diagram of an alternative embodiment of the present invention, wherein the reformer comprises a stack of channels in which combustion channels alternate with reforming channels.

FIG. 2 provides a schematic diagram of another embodiment of the invention, having increased throughput. The reactor shown in FIG. 2 includes a stack of strips, of which four are shown. The strips define channels, in which alternate channels are steam reforming channels, and the remaining channels are combustion channels. The steam reforming channels are at least partially coated with steam reforming catalyst, and the combustion channels are at least partially coated with combustion catalyst. The mixture of hydrocarbon and steam is injected into the reforming channels, i.e. the channels coated with the reforming catalyst, and the mixture of hydrocarbon and air is injected into the combustion channels. As in FIG. 1, hydrocarbon fuel is also added (without additional air), simultaneously, at spaced points along the length of the combustion channels, as indicated by the arrows. Combustion air is injected at one end of each combustion channel.

When one uses a stack of strips, such as in the embodiment of FIG. 2, one must provide piping to deliver hydrocarbon and air, preferably from the same source, to each of the combustion channels, and to deliver hydrocarbon and steam to each of the reforming channels. Such piping is illustrated only schematically in FIG. 2. Also, for clarity of illustration, the figure does not show the means for preventing the strips from nesting together. Such means could include dimples formed in the strips.

Figure 3:
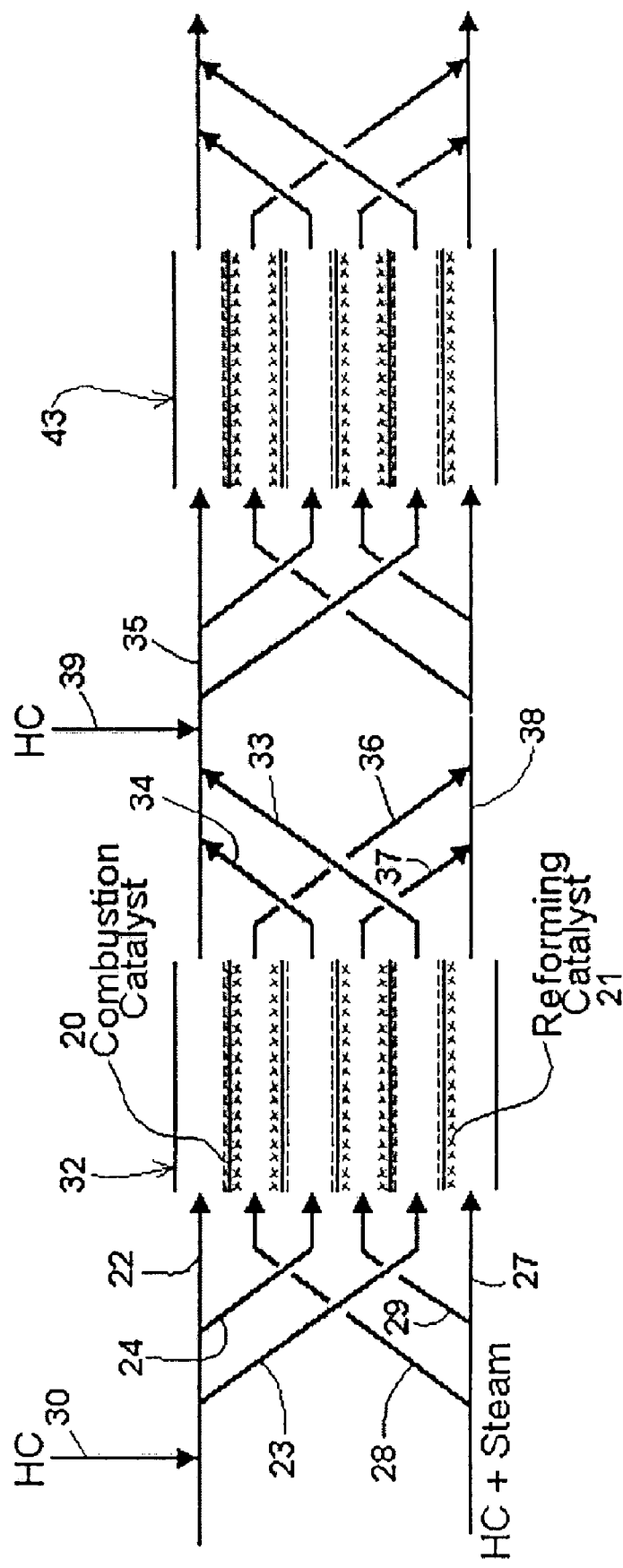
FIG. 3 provides a schematic diagram of a preferred embodiment of the invention, wherein a plurality of reformers, each of the type illustrated in FIG. 2, are arranged in series.

FIG. 3 provides a schematic diagram of a preferred embodiment of the present invention, in which there are a plurality of reactors arranged in series. Each reactor, such as reactors 32 and 43, comprises a stack of strips. Only two such reactors are shown in FIG. 3, but it is understood that further reactors could be provided. In each stack, alternate channels are coated, completely or partially, with a combustion catalyst 20, and the remaining channels are coated, completely or partially, with a reforming catalyst 21. For purposes of illustration, the combustion catalyst is symbolized by dashes, and the reforming catalyst is represented by x's.

Conduit 22 carries a mixture of hydrocarbon (HC) fuel and air, and is intended to supply the various combustion channels. Conduits 23 and 24 branch off from conduit 22, and supply other combustion channels with the fuel-air mixture. In practice, there are many more channels than illustrated, and there are a corresponding number of conduits to supply them.

Conduit 27 carries a mixture of hydrocarbon fuel and steam, and is intended to supply the various steam reforming channels. Conduits 28 and 29 branch off from conduit 27, and supply other reforming channels with the fuel-steam mixture. As is the case for the combustion channels, a practical reactor will have many more channels than the number shown in the drawings, and there will be a correspondingly increased number of conduits to supply fuel and steam to all of the reforming channels.

The fuel in the fuel-air mixture in conduit 22 derives ultimately from a source intended to supply the entire system, though the fuel-air mixture in conduit 22 may have passed through one or more reactor stages before arriving at the particular reactor shown. Both fuel and air enter the first stage. Additional fuel, but not air, is injected before each reactor stage, as symbolized by conduit 30. The fuel entering through conduit 30 comes directly from the source, which may be the same source which supplies all other fuel to the system, and has not passed through any reactor stages before reaching conduit 30. Thus, conduit 30 corresponds generally to the injection of fuel symbolized by the arrows disposed along the length of the reactors shown in FIGS. 1 and 2. Note that the additional fuel entering through conduit 30 is injected into the fuel-air mixture so that it is automatically distributed among the individual combustion channels.

On the output side of reactor 32, conduits 33 and 34 merge into conduit 35, to carry combustion products out of the system, or into the next reactor stage. Similarly, conduits 36 and 37 merge with conduit 38 to carry the products of the reforming reaction out of the system or into the next reactor stage. As before, a new injection of fuel, for combustion, is made through conduit 39, similar to conduit 30.

One difference between the embodiments of FIGS. 1 and 3 is that the fuel in FIG. 1 is injected at various points along a single combustion channel, whereas in FIG. 3, the additional fuel is injected between adjacent reactors arranged in series. The result in both cases is essentially the same.

The diagrams of FIGS. 1–3 are not limited to a particular structure. Many different structures could be used to accomplish what is shown in these figures. One way to make a commercial reformer system is to combine a series of welded plate heat exchangers, such as those that are available from Tranter, Inc. Such an arrangement is shown in FIG. 4, and described below.

Figure 4:
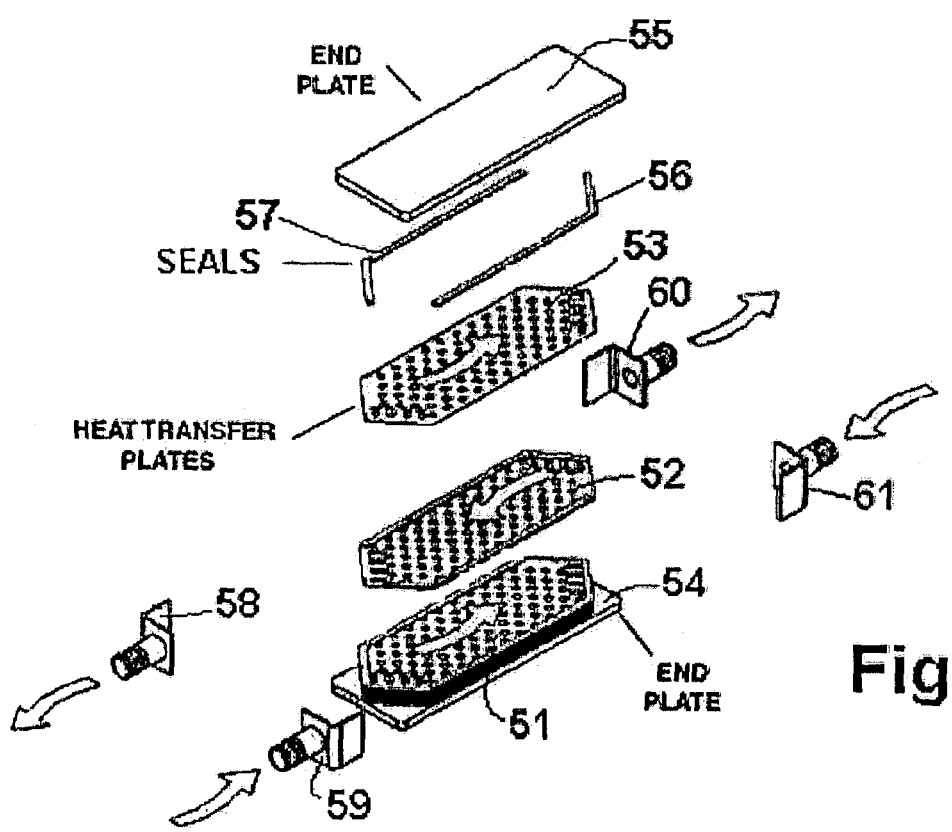
FIG. 4 provides an exploded perspective view of an embodiment of the present invention, wherein each reactor is formed from a stack of dimpled plates.

FIG. 4 shows a stack of heat transfer plates 51, 52, and 53. These heat transfer plates include dimples which prevent the plates from nesting. The heat transfer plates are held together between flat end plates 54 and 55. Also, the sides of the channels defined by the heat transfer plates are sealed by seals 56 and 57, which are metal pieces that close off the sides. Thus, the spaces between adjacent heat transfer plates comprise fully sealed channels. In accordance with the present invention, the channels defined by the plates are alternately coated, either fully or partially, with reforming catalyst and combustion catalyst. Suitable conduits are provided, on either end of the channels, to direct the gas flows in the manner dictated by FIGS. 1–3. These conduits are symbolized by ports 58, 59, 60, and 61, but for purposes of clarity, the diagram does not show connections between the ports and the channels. The above is only one of many ways by which the structure illustrated in FIG. 3 can be realized in practice.

As noted above, the steam reforming reaction produces carbon monoxide. Carbon monoxide will poison the membrane in a fuel cell, even in very small concentrations. It is therefore necessary to follow the reforming reaction with what is known as the "water-gas shift" reaction, which converts carbon monoxide to carbon dioxide, as follows:

$$CO+H_2O \rightarrow CO_2+H_2$$

Note that one produces hydrogen both from the steam reforming reaction and from the water-gas shift reaction.

In the compact reactor of the present invention, the water-gas shift reaction is conducted in a channel that is just a continuation of the steam reforming channel. The catalysts can even be the same.

Figure 5:
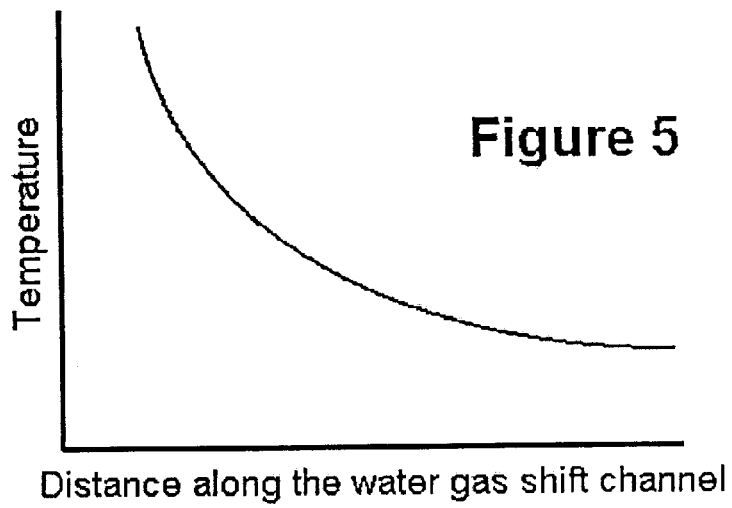
FIG. 5 provides a graph showing an optimum cooling curve for the water-gas shift reaction conducted according to the present invention.

The water-gas shift reaction is exothermic, so that the equilibrium conversion to $CO_2$ and $H_2$ increases as the temperature decreases. The reaction rate also decreases as the temperature decreases. There is thus an optimum cooling curve, which maximizes the final conversion, when the outlet temperature has fallen to about 200° C., where the reaction rate is slow. This would include rapid cooling at high temperature and fast reaction rate, and slow cooling as the final temperature is approached. This optimum cooling curve is shown in FIG. 5. In operating the water-gas shift reactor, one seeks to obtain a cooling profile as represented by this curve. To do so, one injects air into the cooling channel. This cools the channel so as to bring the reaction closer to equilibrium, so that the water-gas shift reaction goes nearly to completion.

Figure 6:
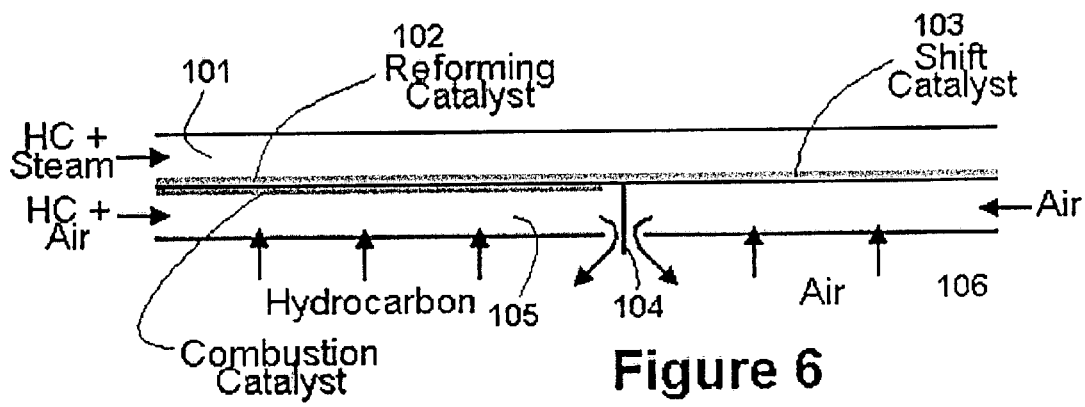
FIG. 6 provides a schematic diagram of an embodiment of the present invention in which a steam reformer is combined with a water-gas shift reactor.

FIG. 6 provides a schematic diagram of a reactor which carries out both the steam reforming and the water-gas shift reactions. Reforming channel 101 is coated, at least partially, with reforming catalyst 102, on the left-hand side of the channel, and with water-gas shift catalyst on the right-hand side. The boundary between the reforming catalyst and the water-gas shift catalyst coincides with baffle 104 that separates the combustion channel 105 from cooling channel 106.

In the embodiment wherein there are a plurality of reactors, as shown in FIG. 3, the reactor of FIG. 6 is located at the end of the series, i.e. at the outlet end of the system. That is, there is only one water-gas shift reactor. Note, however, that the reactor shown in FIG. 6 may be much longer than any of the reactors depicted in FIG. 3. The outlet of the water-gas shift channel comprises the output of the system, which contains hydrogen and carbon dioxide, with only traces of carbon monoxide.

Figure 7:
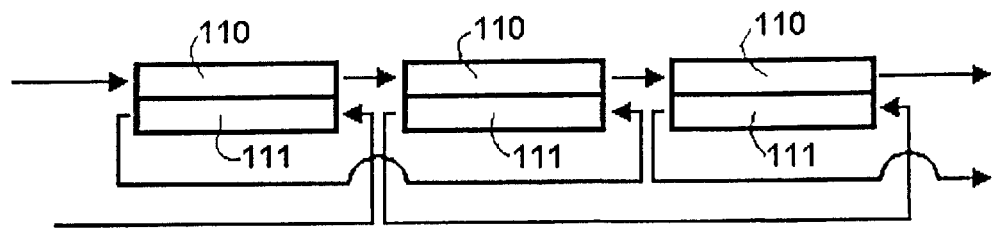
FIG. 7 provides a schematic diagram of a plurality of steam reforming reactors, made according to the present invention, in which the flows in the reforming channels and the combustion channels are mutually countercurrent.

In the embodiments discussed so far, the reforming stream and the combustion gas flow concurrently through the reactors. Alternatively, these two streams can be mutually countercurrent. Such an arrangement is shown schematically in FIG. 7. Thus, for example, if the reforming channels are those identified by reference numeral 110, and the combustion channels are those identified by reference numeral 111, it is seen that the flow of combustion gas, in each reactor, is in the opposite direction to that of the flow of reforming gas. For simplicity of illustration, FIG. 7 does not show a water-gas shift stage, but it is understood that such a stage can be appended to the system as described above.

A possible advantage of countercurrent flow is that it may create a smoother temperature profile through the series of exchangers.

It is an important feature of the present invention that the combustion channels and the steam reforming channels be in intimate thermal contact. Heat from the combustion channel must be able to flow unimpeded to an adjacent reforming channel to drive the reforming reaction. As illustrated in the drawings, the preferred way of insuring such intimate thermal contact is to have a system in which at least some of the metal strips are coated on one side with combustion catalyst and on the other side with reforming catalyst. Thus, only the metal of the strip separates a combustion channel from a reforming channel, and heat can freely flow from the former to the latter.

A preferred steam reforming catalyst is rhodium or palladium, in combination with zirconia. Rhodium can be used as the catalyst for both the steam reforming reaction and the water-gas shift reaction. It is preferred to use platinum and/or palladium as the combustion catalyst.

A preferred catalyst system, for use in the present invention, is described below.

The source of the zirconia was a water-based solution of the oxynitrate $ZrO(NO_3)_2$, a commercial product, which contained 20% $ZrO_2$ and 20% $HNO_3$. The purchased solution was diluted with water. $NH_4OH$ was added until the pH was 7.9. The exact value of the pH is believed not to be important.

A precipitate of $Zr(OH)_4$ was collected on a filter. A solution of rhodium nitrate was stirred into the wet filter cake. The mixture was stirred with a magnetic mixer, on a hotplate. Some water was evaporated during this process.

The resulting product was a thin "soup" of yellow color. This soup comprises a washcoat which could then be painted onto a metal strip with a brush. After being applied to the strip, each coat was calcined.

The rhodium nitrate solution contained excess $HNO_3$ which reacted with the $Zr(OH)_4$ to make the soup.

The same result was obtained by substituting palladium nitrate for the rhodium nitrate. In both cases, the coating was found to adhere to the strip very well.

Figure 8A:
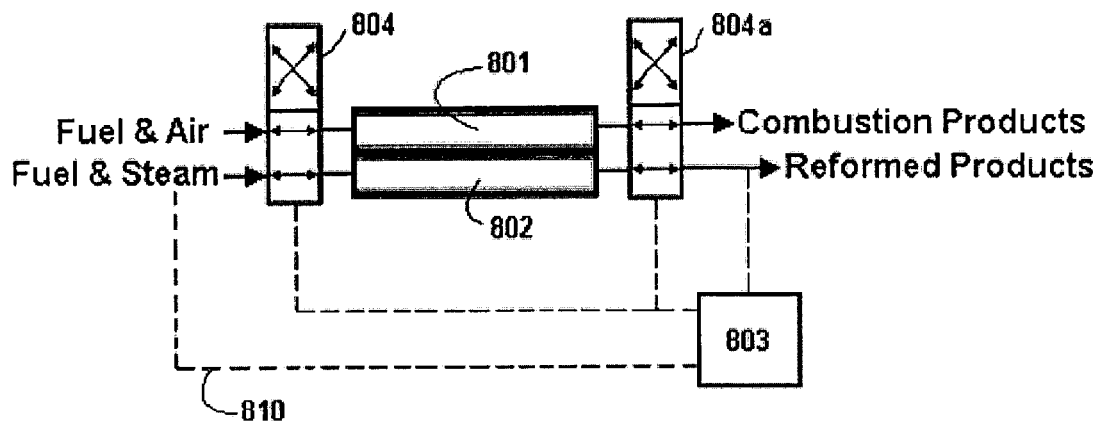
FIGS. 8a and 8b provide schematic diagrams of an alternative embodiment, wherein the identities of the combustion channel and reforming channel are periodically reversed, so that carbon deposits formed in the reforming reaction can be burned off.
Figure 8B:
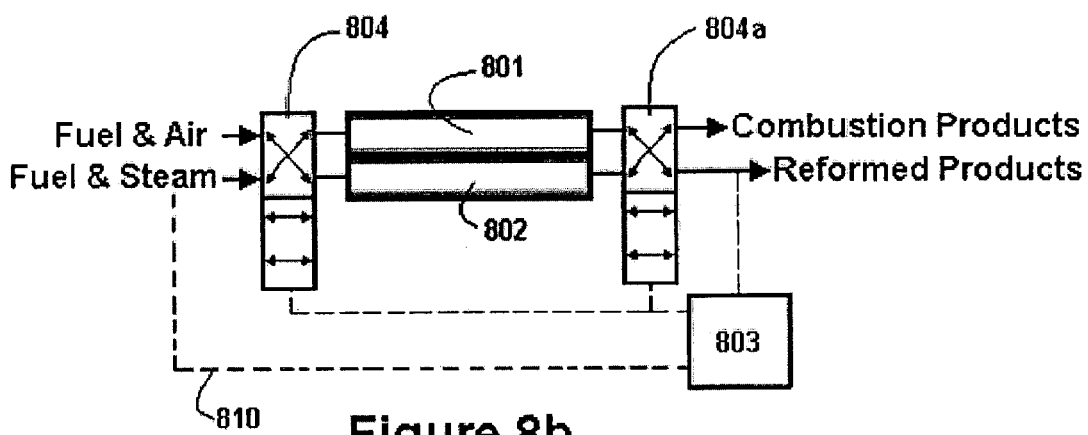

Another embodiment of the invention, represented schematically in FIGS. 8a and 8b, overcomes the problem of carbon deposits that accumulate in the reforming channel. In this embodiment, a first gas stream comprising air and fuel, and a second gas stream comprising steam and fuel, are directed to a two position valve 804. Valve 804 is located upstream of the inlet end of the reactor. Valve 804a, similar in construction to valve 804, is located downstream of the outlet end. Valves 804 and 804a are either mechanically linked, or controlled to operate together, so that they switch positions simultaneously.

In the position shown in FIG. 8a, valve 804 directs the first stream, containing fuel and air, into channel 801 which comprises the combustion channel, and directs the second stream, containing fuel and steam, into channel 802, which comprises the reforming channel. Chromatograph 803 is configured to determine the concentration of fuel in the effluent of the reforming channel.

When carbon deposits accumulate in the reforming channel, the deposits form a barrier between the catalyst and the gases flowing in the channel, thereby making some of the catalyst unavailable to promote the reforming reaction, and thus reducing the conversion of hydrocarbon. Thus, as carbon deposits build up, the concentration of fuel in the effluent of the reforming channel increases. When this concentration exceeds a predetermined level, indicating that the conversion of fuel has fallen below a desired value, the chromatograph (or a computer connected to the chromatograph) signals valves 804 and 804a to switch to their other position, shown in FIG. 8b. Element 803 can represent both the chromatograph and the computer, or other device, which generates a signal that controls the valves. More generally, element 803 represents any measurement and control device which measures the concentration of the unconverted hydrocarbon in the effluent stream of the reforming channel, and which controls the valves accordingly.

In FIG. 8b, the first stream is now directed into channel 802, and the second stream is directed into channel 801. Thus, in FIG. 8b, channel 802 becomes the combustion channel, and channel 801 becomes the reforming channel. The combustion in what formerly was the reforming channel burns off the carbon deposits, while the reforming reaction proceeds in the other channel. The heat generated by the burning of the carbon supplies part of the heat for the reforming reaction occurring in the adjacent channel.

Valve 804a restores the relative positions of the outlet streams. That is, valve 804a insures that, in the arrangement illustrated in FIGS. 8a and 8b, the combustion products will always be shown above the reformed products. It is important to preserve the relative positions of the streams, especially where multiple reactors are connected in series.

By switching the position of valves 804 and 804*a*, the identities of the combustion and reforming channels can be reversed in a matter of seconds. There need be no more than a momentary interruption of the reforming process. The steam reforming function is transferred to the other channel, while the original steam reforming channel is regenerated by burning off the carbon. Thus, the effective conversion ratio of the overall reactor will almost never drop appreciably below 100%, because there is always a fresh channel which can take over the reforming reaction. Thus, for practical purposes, the embodiment of FIGS. 8*a* and 8*b* comprises a steam reformer that operates without interruption, and always at or near peak efficiency.

To operate correctly, the embodiment of FIGS. 8*a* and 8*b* preferably uses the same catalyst on both sides of the strips, i.e. the same catalyst for combustion and for steam reforming. This catalyst can be palladium and zirconia, for example. A given channel supports either combustion or steam reforming, depending on what gas stream is introduced into that channel. If the stream is air and fuel, combustion will occur. If the stream is steam and fuel, steam reforming will occur. It is also possible to use different catalysts in the combustion channel and the steam reforming channel, as long as both catalysts will support both combustion and steam reforming.

The embodiment of FIGS. 8*a* and 8*b* is especially useful in reforming heavy hydrocarbons, such as those having a carbon number in the range of 12–16 or greater, such as is found in the fuel known as JP-8. This embodiment is important in applications where even small deviations from 100% conversion cannot be tolerated, even near the end of a reforming cycle.

In another preferred embodiment, the measurement and control device 803 could include means for monitoring the time at which the valve positions are switched, and for calculating the time interval between movements of the valves. The faster the buildup of carbon deposits, the more frequently it will be necessary to switch the valve positions. Thus, a reduction in the time interval between valve operations is directly related to the rate of accumulation of carbon. The control device 803 is therefore programmed such that if the interval between valve operations falls below a predetermined level, the control device increases the proportion of steam entering the reactor. This control is indicated in FIGS. 8*a* and 8*b* by an additional dotted line 810 extending from control device 803 to the line which supplies the steam. The control device can adjust the proportion of steam by controlling a suitable valve (not shown in the figures), at a position in the line before the steam is mixed with the fuel. In general, an increase in the proportion of steam causes an increase in the conversion, and therefore reduces the rate at which carbon is deposited.

The embodiment of FIGS. 8*a* and 8*b* can be generalized further. The apparatus could include a plurality of valves, similar to valves 804 and 804*a*, corresponding to a stack of channels, for changing the character of multiple selected channels from combustion channels to steam reforming channels, and vice versa.

Figure 9:
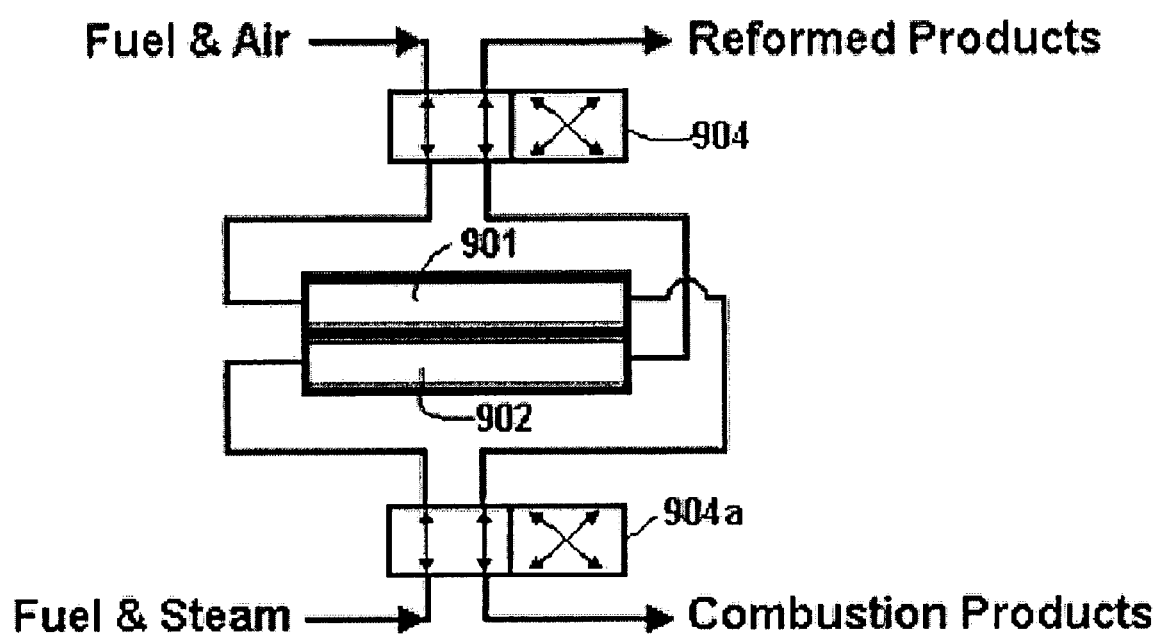
FIG. 9 provides a schematic diagram of another embodiment, wherein the combustion and reforming channels are switched, and wherein the directions of flow of the gas streams are periodically reversed.

FIG. 9 shows another embodiment of the invention, wherein the identities of the combustion and reforming channels are switched, and wherein the direction of flow through the channels is reversed. Valves 904 and 904*a* are mechanically linked or operated together (similar to the operation of valves 804 and 804*a* of FIGS. 8*a* and 8*b*). In the position shown in FIG. 9, fuel and air flows through valve 904 and enters channel 901, flowing from left to right. Channel 901 is therefore the combustion channel. The combustion products flow through valve 904*a* and exit at the lower right-hand portion of the drawing. Fuel and steam flows through valve 904*a*, and into channel 902, flowing from left to right. Channel 902 is therefore the reforming channel. The reformed products flow through valve 904 and exit at the upper right-hand portion of the drawing.

Now consider the situation when the valves are switched to their alternate positions. (The alternate valve position is not explicitly shown in FIG. 9, but is implicit in the drawing.) Fuel and air passes through valve 904, and is directed to channel 902, flowing from right to left. Channel 902 therefore becomes the combustion channel. The combustion products flow through valve 904*a*, and exit at the lower right-hand side of the drawing. Fuel and steam passes through valve 904*a*, and is directed to channel 901, flowing from right to left. Channel 901 is now the reforming channel. The reformed products flow through valve 904, and exit at the upper right-hand portion of the drawing.

Thus, the arrangement of FIG. 9 simultaneously switches the combustion channel and the reforming channel, and also reverses the direction of flow through both channels. The configuration of the input and output streams is constant throughout; only the valve positions are changed. Thus, for example, the combustion products always appear at the lower right-hand side, and the reformed products always appear at the upper right-hand side.

The embodiment of FIG. 9 has the advantage of removing sulfur deposits that may form at the low-temperature end of the reforming channel. Also, carbon deposits are likely to become deposited preferentially at one end or the other. When the direction of flow is reversed, the low-temperature end becomes the high-temperature end, and vice versa. Sulfur deposits that accumulated at the low-temperature end will now be vaporized from the catalytic surface when that portion of the channel becomes the high-temperature end. Similarly, carbon deposits that accumulated preferentially at one end are likely to be burned off more readily when the direction of flow is reversed.

In FIG. 9, the same valves that cause the channel switching also cause the reversal of flow. The decision on when to switch channels is made in the same manner as shown in FIGS. 8*a* and 8*b*, using a measurement and control device similar to element 803 of the above-mentioned figures. For simplicity of illustration, the control device is not explicitly shown in FIG. 9.

In theory, the times at which the flow is reversed, and the times at which the channels are switched, could be different and independent of each other. Such an arrangement would require a different valve configuration than what is shown, but should be considered within the scope of the invention. But it is believed that the problem of sulfur deposition can be adequately solved by reversing the direction of flow at the same time that the channels are switched, and the arrangement of FIG. 9 is therefore considered the preferred embodiment for providing both channel switching and flow reversal.

The choice of whether to use the embodiment of FIGS. 8*a* and 8*b* or the embodiment of FIG. 9 depends on the length of the channel. If the channel is relatively short, the temperature gradient in the channel will be small, and there would be no need for flow reversal. In this case, one would choose the embodiment of FIGS. 8*a* and 8*b*. If the channel is long, it is more likely that the temperature will vary significantly along its length, and the embodiment of FIG. 9 would be preferred. Moreover, the embodiment of FIG. 9 could still be used even with a relatively short channel.

The present invention has a primary advantage of compactness. This advantage is achieved by providing combustion on one side of a strip and steam reforming on the other. Also, the use of a stack of multiple layers further enhances the ability of the reactor to work in a compact space. The compactness is further enhanced by providing the reforming and water-gas shift reactions in the same channel, and by providing the cooling air in what would otherwise be a continuation of the combustion channel, as shown in FIG. 6.

The invention can be modified in various ways. The arrangement shown in FIG. 4 is only one example of a realization of the structure illustrated schematically in FIGS. 1–3. Other steam reforming catalysts could be used instead of those mentioned above. Also, the catalyst coating may be applied by any of the many known techniques, such as painting the coating onto the strip with a brush, vapor deposition, spray coating, or by other methods. Such modifications, which will be apparent to those skilled in the art, should be considered within the spirit and scope of the following claims.

What is claimed is:

1. A steam reformer comprising:
   a) an elongated reactor having a thermally conductive partition which divides the reactor into first and second channels, both channels being coated with catalysts which are suitable for promoting both combustion and steam reforming reactions, the reactor having an inlet end and an outlet end,
   b) an inlet valve connected to direct a first stream comprising fuel and air, and a second stream comprising fuel and steam, into said channels at the inlet end, wherein in a first valve position, the first stream is directed into the first channel and the second stream is directed into the second channel, and wherein in a second valve position the first stream is directed into the second channel and the second stream is directed into the first channel,
   c) an outlet valve connected, at the outlet end, to direct gas streams from said first and second channels into conduits for combustion products and reformed products, wherein in a first valve position, the outlet valve directs gas from said first channel into said conduit for combustion products and directs gas from said second channel into said conduit for reformed products, and wherein in a second valve position, the outlet valve directs gas from said first channel into said conduit for reformed products and directs gas from said second channel into said conduit for combustion products, and
   d) means for simultaneously switching positions of said inlet valve and said outlet valve such that both of said valves are in a same position.

2. The steam reformer of claim 1, wherein the switching means includes a measuring device connected to measure a concentration of a component in said conduit for reformed products, the measuring device comprising means for controlling the inlet and outlet valves in response to said concentration.

3. The steam reformer of claim 2, wherein the measuring device also comprises means for computing a time interval between valve operations, and for adjusting a flow of steam in response to said time interval.

4. The steam reformer of claim 1, wherein the catalysts in said first and second channels are made from a same material.

* * * * *